(12) United States Patent
Gurin et al.

(10) Patent No.: US 6,753,657 B2
(45) Date of Patent: Jun. 22, 2004

(54) DISCRETE MODULATION BALLAST OPERATION AND METHOD OF USE

(75) Inventors: Michael H. Gurin, Glenview, IL (US); Ken Roll, Oberlin, OH (US)

(73) Assignee: CogniTek Management Systems, Northfield, IL (US)

(*) Notice: Subject to any disclaimer, the term of this patent is extended or adjusted under 35 U.S.C. 154(b) by 0 days.

(21) Appl. No.: 10/052,805

(22) Filed: Jan. 23, 2002

(65) Prior Publication Data

US 2002/0079844 A1 Jun. 27, 2002

Related U.S. Application Data

(60) Provisional application No. 60/250,961, filed on Dec. 4, 2000.

(51) Int. Cl.[7] .............................. G05F 1/00; H05B 41/16
(52) U.S. Cl. .................................. 315/209 R; 315/291
(58) Field of Search .......................... 315/307, 291, 315/224, 297, 360, 362, 308, 209 R, 246, 194, 287, DIG. 5, DIG. 7

(56) References Cited

U.S. PATENT DOCUMENTS

| | | | | | |
|---|---|---|---|---|---|
| 5,306,987 A | * | 4/1994 | Dakin et al. | ................ | 315/248 |
| 5,684,367 A | * | 11/1997 | Moskowitz et al. | ........ | 315/246 |
| 5,773,937 A | * | 6/1998 | Miyazaki et al. | ........... | 315/246 |
| 6,107,754 A | * | 8/2000 | Kim | ........................... | 315/291 |
| 6,184,633 B1 | * | 2/2001 | Kramer | ...................... | 315/246 |
| 6,225,754 B1 | * | 5/2001 | Horiuchi et al. | ............ | 315/246 |
| 6,400,100 B1 | * | 6/2002 | Kramer | ...................... | 315/291 |

* cited by examiner

Primary Examiner—Don Wong
Assistant Examiner—Chuc Tran

(57) ABSTRACT

A control algorithm and method to achieve arc stabilization for a gas discharge lamp having a light transmissive arc tube excitable to a discharge state upon introduction of a drive signal having a predetermined frequency associated therewith, includes a discrete modulating algorithm effective for providing a modulating signal which is imposed onto the drive signal. The modulating signal has a periodic cycling of discrete stepped frequencies that minimizes the acoustic resonance of the gases within the lamp. The control algorithm and method provides an effective stabilization of the gas discharge lamp's arc throughout the entire operating range of the lighting system.

20 Claims, 2 Drawing Sheets

FIG. I
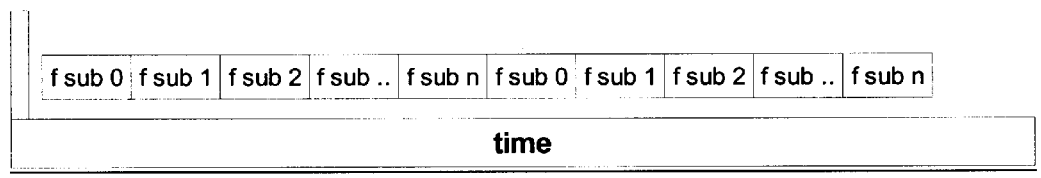

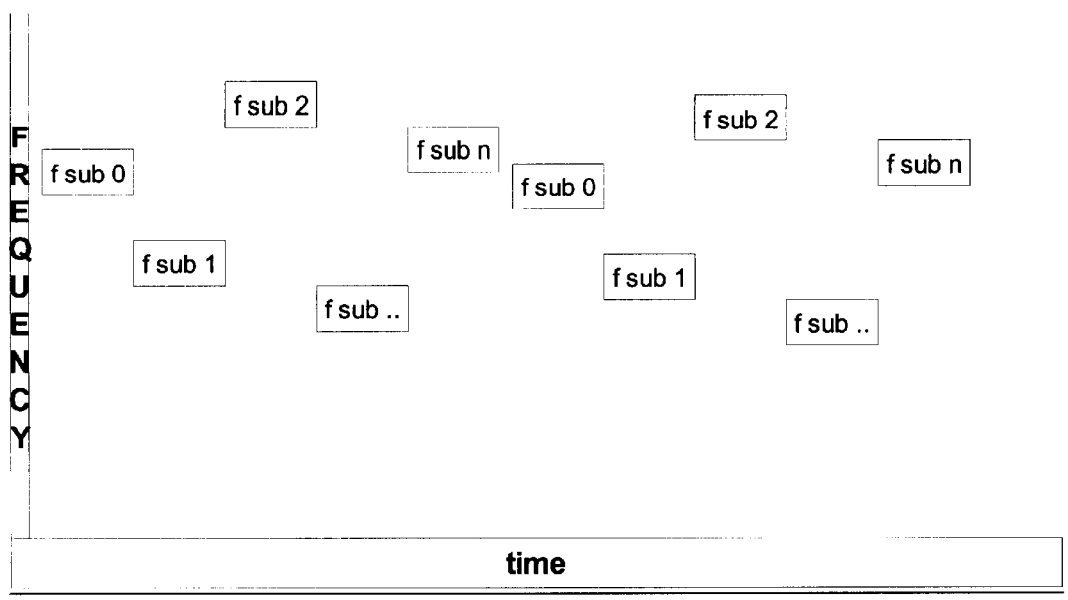
FIG. II

DISCRETE MODULATION BALLAST OPERATION AND METHOD OF USE

CROSS-REFERENCE TO RELATED APPLICATIONS

This application references the now abandoned U.S. Provisional Patent Application No. 60/250,961 filed Dec. 4, 2000.

BACKGROUND OF THE INVENTION

The present invention relates to the field of high intensity discharge lighting, and in particular to a gas discharge lamp subject to arc instability due to acoustic resonance.

Gas discharge lamps, generally understood as a family of illumination devices such as fluorescent, sodium, metal halide, mercury and others are commonly used sources of illumination. The term HID is generally understood as a family of high intensity discharge illumination devices within the full spectrum of gas discharge devices. U.S. Pat. No. 5,883,475 defines the prior art and issues surrounding their operation at high frequencies exceptionally well as detailed below within the prior art section.

It is well known that the efficiency of gas discharge lamps is generally improved by operating such lamps by means of high frequency electrical input power to drive the discharge within the lamp. However, high frequency operation of relatively short lamps introduces the potential generation of acoustic compression waves in resonance with the natural acoustic frequencies of the lamp. It is also well known that the natural acoustic frequencies are affected by the variation of operating parameters including lamp lifetime and temperature.

The use of alternating current (AC) to power a gas discharge introduces a time-varying application of electrical power to the electrodes of the lamp. This time-varying application of electrical power generates variations in the gas through which the electrical discharge occurs. The alternative attraction and repulsion of electrons (and corresponding repulsion and attraction of positive ions) from a discharge electrode causes pressure variations in the gas in the vicinity of the electrodes that generates local regions of compression. Such pressure variations created in the vicinity of a discharge electrode will typically propagate into the gas of the lamp as an "acoustic wave" or an "acoustic compression wave". Thus, these acoustic waves are an inherent and unavoidable consequence of driving the electrical discharge by means of alternating positive and negative voltage being applied to the discharge electrodes.

When the discharge-induced acoustic compression waves occur at the natural acoustic frequencies of the HID lamp, acoustic resonance occurs. The phenomenon of acoustic resonance essentially generates standing pressure waves within the HID tube. Such waves can cause the light from the lamp to flicker; cause the arc within the tube to warp, bend or become extinguished; or in extreme cases cause the arc to contact the walls of the HID lamp and damage or destroy the tube itself. Even modest variations in spacial or temporal light intensity are unacceptable in many applications of HID lamps in which focusing of the light is necessary. Other deleterious effects of acoustic resonance may considerably shorten the service lifetime of the lamp.

The precise frequencies at which acoustic resonance occurs are a complex function of the composition, temperature and pressure of the gas within the HID tube, and the geometry of the tube itself. In addition, the composition, temperature and pressure of the gas varies from place to place within the tube, being typically hotter and less dense near the center of the arc while cooler and more dense near the walls of the tube. Adding further to the complexity of acoustic resonance is the fact that the properties of the tube and the gas are not constant over time. Tube electrodes will typically change their geometry over the lifetime of the lamp as they are subjected to numerous hours of electrical discharge and bombardment by ions, electrons and neutral species from the gas of the HID tube. The composition of the gas will similarly change over time as chemical processes within the HID gas proceed over many hours of operation. Practical manufacturing tolerances also lead to variations in tube geometry from lamp to lamp, even when new. All these factors accumulate so as to make it exceedingly difficult to predict with any reasonable precision the acoustic resonance frequencies of a particular HID tube, or to predict how such acoustic resonance frequencies will change over the service lifetime of the lamp. In general, acoustic resonance frequencies tend to occur in the range above about 10 KHz for typical HID lamps, increasing thereby the complexity in obtaining efficient, high frequency operation of such lamps.

Several past attempts have been made to avoid acoustic resonance and to sweep through the acoustic resonance frequency to avoid the accompanying instability of the gas discharge arc when the operating frequency approaches the natural acoustic frequencies of the lamp. Only U.S. Pat. No. 5,680,015 titled "Method to operate a discharge lamp, and circuit arrangement for operation of the discharge lamp" of Bernitz et al discloses the utilization of a testing phase comprised of discrete stepping frequencies to determine the stable region of operation. Bernitz subsequently utilizes a single frequency within their designated stable frequency range for lamp operation.

In contrast to much of the prior art, the present invention is not based upon a ramp sweeping through acoustic resonant frequencies of the particular gas discharge lamp. Rather, the present invention utilizes discrete modulation frequency steps. In carrying out the efforts that resulted in the present invention, it was discovered that the operation of the drive signal in conjunction with a discrete modulation step frequency in the acoustic resonance band could provide the desired arc stability.

None of such patents relate to the use of discrete modulation frequency steps to improve output stability. In contrast, the present inventors have developed a new operational method and system using discrete modulation frequency steps in the operation of a gas discharge lamp to provide improved photometric characteristics regardless of lamp orientation. The present invention provides a new, optimal and low cost operational method of use and system, which achieves superior performance over the above-referenced prior art, and others.

SUMMARY OF THE INVENTION

In accordance with one aspect of the present invention, a discrete modulation ballast operation is provided. The operation includes the periodic cycling of multiple individual frequencies to drive a gas discharge lamp with arc stability. In accordance with yet another aspect of the present invention, a microprocessor is provided to control the discrete modulation ballast operation. The operation includes the start-up, re-strike, dimming, and communications procedures to drive a gas discharge lamp. In accordance with another aspect of the present invention, a discrete modulation ballast dimming operation is provided. The operation includes an incremental step increase of frequency of the periodic cycling of full power multiple individual frequencies that drive a gas discharge lamp. In accordance with another aspect of the present invention, a R-C circuit is introduced to delay and eliminate the overlap of two out-of-phase square waves is provided. In accordance with yet another aspect of the present invention, a dynamic feedback method is provided. The operation includes the feedback method of actively modifying the discrete frequency steps.

As used herein, the lighting system is used to imply the collective ballast and lamp components.

As used herein, processor requirements are used to imply the microprocessor digital pulse output and processing speed to support the ballast's operations.

As used herein, the term discrete is used to imply a discontinuous step function of multiple individual frequencies that switch steps at a fixed time interval.

As used herein, the term microprocessor programs is used to collectively encompass the control algorithms utilized throughout the entire range of lighting system's operations. The lighting system's operations include arc striking during start-up, arc re-striking following lamp operation, continuous dimming operation, discrete multi-level dimming operation, light level maintenance operation, and other strategies as determined by an energy management system.

As used herein, the term energy management system is used to collectively encompass an overall strategy of multiple lighting systems within a physical structure (e.g., building, home, etc.). The overall strategies include real-time day lighting control, occupancy sensing control, time scheduled light level control, demand load shedding control, real-time demand light level control, and other control algorithms.

As used herein, the term acoustic resonance is the phenomena of a frequency or range of frequencies associated therewith and which occurs within the arc tube of a discharge lamp in conjunction with the excitation of the gases contained within the arc tube. The acoustic resonance condition is one wherein periodic oscillations in pressure occur in phase with the amplitude-modulating component of the input power thereby producing standing pressure waves.

An advantage of the present invention is to provide a method to operate a gas discharge lamp with solid-state ballast that provides for stable and flicker-free operation by minimizing acoustic resonance. A method to operate a gas discharge lamp with solid-state ballast provides for a stable, flicker-free operation throughout its entire continuous dimming range. Another advantage of the present invention is to provide a R-C circuit method to reduce the processor requirements of the microprocessor and subsequent cost of the lighting system. Another specific advantage of the present invention is to provide an active method to further enhance the stability of the gas discharge lamp for flicker-free operation. Other advantages of the present invention derive from the microprocessor programs to achieve the desired power and lumen levels in accordance to energy management system directives.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

BRIEF DESCRIPTION OF DRAWINGS

The above objects and other advantages of the present invention will become apparent by describing in detail preferred embodiments thereof with reference to the attached drawings, in which:

FIG. I shows a periodic cycling of predetermined discrete stepped frequencies

FIG. II shows a semi-random series of individually discrete stepped frequencies

DETAILED DESCRIPTION OF THE PRESENTLY PREFERRED EMBODIMENTS

A discrete modulation ballast operation is provided for use in lighting systems comprised of solid-state ballast and gas discharge lamp that enhances the arc stability throughout its operating range.

A discrete modulation ballast operation has a number of advantages, including increased stability of lighting system through its continuous dimming range, while minimizing electronic components and microprocessor requirements providing increased cost effectiveness.

The discrete modulation ballast operation is preferably comprised of multiple discontinuous frequency steps and is influenced by arc stability and microprocessor requirements. Preferred multiple discontinuous frequency steps number from three steps to twenty steps. More preferred multiple discontinuous frequency steps number from five steps to ten steps. Particularly preferred multiple discontinuous frequency steps number six.

The discrete modulation ballast operation is preferably operated in a periodic cycling of the multiple discontinuous frequency steps and is influenced by arc stability and microprocessor requirements. Preferred periodic cycling, as shown in FIG. I occurs with a time basis for each step from 0.1 milliseconds to 100 milliseconds. More preferred periodic cycling occurs with a time basis for each step from 2 milliseconds to 20 milliseconds. Particularly preferred periodic cycling occurs with a time basis for each step of 10 milliseconds.

The discrete modulation ballast operation is preferably comprised of multiple discontinuous frequency steps and is influenced by arc stability and microprocessor requirements. Preferred multiple discontinuous frequency steps range from sequential discrete steps, discrete steps forming a sinusoidal shape, discrete steps in a semi-random shape as shown in FIG. II. More preferred multiple discontinuous frequency steps are semi-random steps. Particularly preferred multiple discontinuous frequency steps are semi-random ordered steps with a discrete level of one kilohertz.

The discrete modulation ballast operation is preferably comprised of multiple discontinuous frequency steps with each individual step dynamically modified by a feedback analysis as influenced by arc stability. Preferred individual discrete steps are determined by monitoring arc stability parameters and modified when an individual step deviates from 1% to 100% of the individual steps stability parameters to the average of the remaining steps stability parameters. More preferred an individual step is replaced with another individual step when the individual step deviates from 10% to 25% of the individual steps stability parameters to the average of the remaining steps stability parameters. Particularly preferred an individual step is replaced with another individual step when the individual step deviates from 20% of the individual steps stability parameters to the average of the remaining steps stability parameters.

The discrete modulation ballast operation is preferably comprised of multiple discontinuous frequency steps with each individual step originally selected by a predetermined basis and optionally then dynamically modified by a feedback analysis as influenced by arc stability. The individual step is replaced with another individual step as determined by an adaptive control algorithm. The adaptive control algorithm is selected as an incremental increase of step size from the original individual step to be replaced, as an incremental decrease of step size from the original individual step to be replaced, as an incremental increase of step size from the upper most step, as an incremental decrease of step size from the lower most step, and a random step selected from within a specified frequency range. More preferred an individual step is replaced by an incremental step selected within the specified frequency range. Particularly preferred an individual step is replaced with another step plus 0.5 kHz from the opposite spectrum of all of the individual steps range.

The discrete modulation ballast operation generates a square wave drive signal at twice the actual switching frequency into a "flip flop" to generate two square waves out of phase, then "and" them with a R-C circuit to introduce a time delay in order to eliminate overlap of each output. Preferred time delay from the R-C circuit ranges from 1% to 25% of the periodic cycle time between each individual step. More preferred the time delay from the R-C circuit ranges from 1% to 5% of the periodic cycle time between each individual step. Particularly preferred time delay from the R-C circuit is 2% of the periodic cycle time between each individual step.

The discrete modulation ballast operation is preferably comprised of multiple discontinuous frequency steps with each individual step modified by a dimming algorithm as influenced by arc stability. The preferred dimming algorithm is selected from an increase in frequency of fixed steps for an incremental decrease in light level, an increase in frequency of fixed percentage for an incremental decrease in light level, a time based ramp in incremental fixed step size for an incremental decrease in light level through a light level feedback loop, a time based ramp in incremental fixed step percentage size for an incremental decrease in light level through a light level feedback loop, and an externally determined incremental step size as determined by an energy management system. More preferred the incremental step size is determined solely by the ballast's microprocessor program. Particularly preferred incremental step size is a fixed percentage increase respective of an incremental decrease in light level with each step occurring at a fixed interval until the desired decrease in light level is achieved.

The discrete modulation ballast operation is particularly useful in combination with gas discharge lamps.

Exemplary gas discharge lamps include fluorescent, sodium, metal halide, mercury-free, and xenon. Other suitable gases included in the invention are any arc capable gases and combinations of individual gases.

The method of the present invention may take other embodiments. Alternatively discrete modulation ballast operation is incorporated into an analog equivalent circuit without the benefit of the solid-state components. In such cases it is preferable that the number of electronic components are kept to a minimum.

The discrete modulation ballast operation is particularly useful in combination with circuitry that produces an alternating current of sinusoidal power output to the discharge lamp. Alternatively the waveform may be square, triangle, or saw-tooth.

A surprising feature of the discrete modulation ballast is its increased effectiveness within gas discharge processes. There thus remains a need in the art for a discrete modulation frequency stepped ballast operating in a periodic cycle that's suitable for a wide range of lighting systems, over a wide range of applications, that is compatible with present delivery systems.

Without intending to limit the scope of the invention, the following examples describe a method of operating and using the discrete modulation frequency steps of the present invention. Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims. All of the examples below are hereinafter referred to as group and known as discrete modulation frequency steps.

EXAMPLES

Example 1

50–51–52–53–52–51–50–49–48–47–48–49–50 (kHz) in 10 millisecond steps at each frequency with periodic cycling. Dimming occurs by increasing each step by 1 kHz for each unitary dimming step.

Example 2

50–51–52–51–50–49–48–49–50 (kHz) in 10 millisecond steps at each frequency with periodic cycling. Dimming occurs by increasing each step by 1 kHz for each unitary dimming step.

Example 3

50–51–49–52–48–50 (kHz) in 10 millisecond steps at each frequency with periodic cycling. Dimming occurs by increasing each step by 1 kHz for each unitary dimming step.

While the foregoing examples are illustrative of various embodiments of the invention, those of ordinary skill in the art will understand and appreciate that such examples are non-limiting and that variations in for example, discrete modulation steps, frequency, occurrence of steps, waveform, electronic circuitry or utilization of microprocessor are contemplated and included within the scope of the present invention which is limited only by the claims appended hereto.

What is claimed is:

1. A discrete modulation frequency step operation for arc stabilization of device susceptible to acoustic resonance having an arc tube excitable to a discharge state upon introduction thereto of a drive signal having multiple individual discrete frequency steps in a periodic cycle therewith, said discrete modulation operation comprising:

means for modulating said drive signal with a period cycling of discrete frequency steps associated with said drive signal;

means for modulating said drive signal using electronic and solid-state components; and means for modulating individual discrete frequencies in semi-random steps;

wherein said frequency of said modulating signal is set to multiple individual discrete non-continuous frequencies.

2. The discrete modulation frequency step operation for arc stabilization of device of claim 1, said arc stabilization being a gas discharge lighting system.

3. The arc stabilization device of claim 2 having gas discharge lighting system, said gas discharge lighting system further being comprised of gas discharge lamps selected from the group of fluorescent, sodium, metal halide, mercury-free, xenon and combinations of individual gases lamps.

4. The discrete modulation frequency step operation for arc stabilization of device of claim 1 having electronic and solid-state components, said electronic and solid state components include analog circuitry, microprocessor, and R-C circuitry.

5. The R-C circuitry of claim 4, said R-C circuitry is comprised of at least one circuit to generate a square wave drive signal at twice the actual switching frequency into a "flip flop" to generate two square waves out of phase, then "and" them with a R-C circuit to introduce a time delay in order to eliminate overlap of each output.

6. The discrete modulation frequency step operation for arc stabilization of device of claim 1 having drive signal, said drive signal has a waveform selected from the group of sinusoidal, triangle, saw-tooth, and square waveforms.

7. The discrete modulation frequency step operation for arc stabilization of device of claim 1 having drive signal, said drive signal has a waveform that is sinusoidal.

8. The discrete modulation frequency step operation for arc stabilization of device of claim 1 having means of modulating individual discrete frequency steps, said individual discrete frequency steps are modulated as a group to achieve dimming in accordance to a dimming algorithm.

9. The discrete modulation frequency step operation for arc stabilization of device of claim 1 having means of modulating individual discrete frequency steps, said individual discrete frequency steps are modulated as a group to achieve dimming in accordance to a dimming algorithm, wherein the algorithm is selected from a group of an increase in frequency of fixed steps for an incremental decrease in light level, an increase in frequency of fixed percentage for an incremental decrease in light level, a time based ramp in incremental fixed step size for an incremental decrease in light level through a light level feedback loop, a time based ramp in incremental fixed step percentage size for an incremental decrease in light level through a light level feedback loop, and an externally determined incremental step size as determined by an energy management system.

10. A discrete modulation frequency step operation for arc stabilization of device susceptible to acoustic resonance having an arc tube excitable to a discharge state upon introduction thereto of a drive signal having multiple individual discrete frequency steps in a periodic cycle therewith, said discrete modulation operation comprising means for modulating individual discrete frequency steps, wherein said individual discrete frequency steps is selected from the group of three to twenty individual frequencies.

11. The discrete modulation frequency step operation for arc stabilization of device of claim 10 having individual discrete frequency steps of claim 10, said individual frequency steps are selected on a predetermined basis.

12. The discrete modulation frequency step operation for arc stabilization of device of claim 10 having individual frequency steps selected on a predetermined basis, said individual discrete frequency is replaced in accordance to feedback analysis and adaptive control algorithm.

13. The discrete modulation frequency step operation for arc stabilization of device of claim 10 having individual frequency steps on a predetermined basis, said individual discrete frequency is replaced in accordance to feedback analysis and adaptive control algorithm based on monitored arc stability parameters to determine a replaced individual frequency.

14. The discrete modulation frequency step operation for arc stabilization of device of claim 10 having individual frequency steps selected on a predetermined basis, said individual discrete frequency is replaced in accordance to feedback analysis and adaptive control algorithm, wherein the algorithm is selected from the group of an incremental increase of step size from the original individual step to be replaced, as an incremental decrease of step size from the original individual step to be replaced, as an incremental increase of step size from the upper most step, as an incremental decrease of step size from the lower most step, and a random step selected from within a specified frequency range.

15. The discrete modulation frequency step operation for arc stabilization of device of claim 10 having individual frequency steps selected on a predetermined basis, said individual discrete frequency is replaced with another individual frequency plus 0.5 kHz from the opposite spectrum of all of the individual steps range.

16. The discrete modulation frequency step operation for arc stabilization of device of claim 10 having multiple individual discrete frequency steps in a periodic cycle, said multiple individual discrete frequency steps being comprised of six discrete frequency steps.

17. The discrete modulation frequency step operation for arc stabilization of device of claim 10 having multiple individual discrete frequency steps in a periodic cycle, said periodic cycle wherein the time basis for each step is selected from the group ranging from 0.1 milliseconds to 100 milliseconds.

18. The periodic cycle having time basis for each step of claim 17, said time basis is 10 milliseconds.

19. The discrete modulation frequency step operation for arc stabilization of device of claim 10 having individual discrete frequency steps of claim 10, said individual frequency steps are sequenced as selected from the group of sequential discrete steps, discrete steps forming a sinusoidal shape, discrete steps in a semi-random shape.

20. The discrete modulation frequency step operation for arc stabilization of device of claim 10 having individual discrete frequency steps of claim 10, said individual frequency steps are sequenced in a semi-random shape.

* * * * *